United States Patent Office 2,803,600
Patented Aug. 20, 1957

2,803,600

PARTIALLY UNSATURATED CHLORINE ADDUCTS OF ALKYLBENZENES, AND METHOD OF MAKING THEM

Frederick H. Norton, Concord, Calif., assignor to The Dow Chemical Company, Midland, Mich., a corporation of Delaware No Drawing. Application February 20, 1952, Serial No. 272,711

6 Claims. (Cl. 204—163)

This invention relates to certain new partially unsaturated chlorine adducts of monoalkylbenzenes, and particularly to the method whereby they may be made.

It is well known that aromatic hydrocarbons react in either of two ways with chlorine. Most commonly, when iron or other catalysts are used, and chlorination is effected in the dark at low temperatures, the chlorine reacts by substitution, replacing part or all of the hydrogen atoms attached to the aryl nucleus. Alkyl aromatic hydrocarbons may be chlorinated by substitution both in the ring and in the alkyl side chain. Side chain chlorination is favored by light, by high temperatures, and by such catalysts as phosphorous pentachloride. Aromatic hydrocarbons also are known to react with chlorine, commonly under the influence of actinic radiations, to form fully saturated addition products without replacement of any hydrogen atoms. Alkyl aromatic hydrocarbons have been known to undergo both substitution of chlorine for hydrogen in the side chain and addition of chlorine to saturate the ring. It is uncommon for chlorine to react almost exclusively by addition to an alkyl benzene to saturate only a part of the original double bonds in the ring, leaving one or two double bonds, yet the products of such reaction would be desirable.

There is a report by Pieper, Liebig's Annalen der Chemie, 1867, 142, 304 and Bulletin de la Societe chimique de Paris, Ser. II, 9, 229 (1868), of the photochlorination of toluene to produce a compound designated as an octachloromethylcyclohexene. From the formula given, $C_7H_6Cl_8$, the compound would now be designated as an octachloromethylcyclohexane, and most probably, from its described chemical reactions, it was a dichloromethyl hexachlorocyclohexane. In a more recent article by Galitzenstein and Woolf, Journal of the Society of Chemical Industry, 69, 349–352 (1950), and in their U. S. Patent No. 2,573,394, the chlorination of alphachloro ethylbenzene, with iodine catalyst and with complete exclusion of light, is described as giving mixed products in which 35 to 40 percent of the chlorine reacts by addition and 60 to 65 percent of it by substitution to give a mixture of alphachloroethyl chlorobenzenes, alphachloroethyl dichlorocyclohexadiene, alphachloroethyl tetrachlorocyclohexane, and alphachloroethyl hexachlorocyclohexane. It would be desirable to be able to produce, as the chief products, the partially unsaturated chlorine adducts of alkylbenzenes without significant substitution of chlorine either in the ring or on the side chain. The products of such a reaction would be new compounds with many possible uses in organic synthesis and in agricultural economy.

It is an object of the invention to provide a method whereby an alkylbenzene, such as ethyl benzene, can be made to react with chlorine to produce alkyl dichlorocyclohexadienes and alkyl tetrachlorocyclohexenes as the principal products. A related object is the provision of these interesting new compounds.

According to the present invention, the foregoing and related objects may be realized by subjecting an alkylbenzene to the action of an excess of liquid chlorine (at a temperature at or below —33.7° C.) while exposing the mixture to diffused daylight at an intensity of less than 85 foot candles. The proportion of the desired product becomes smaller as the light intensity is increased, and the practical limit is near 85 foot candles, with much lower intensities being preferred. The reaction may be controlled readily by adding the alkylbenzene dropwise or in successive small portions to the liquid chlorine. Reaction is practically instantaneous, and, when the alkylbenzene has all been added, the reaction mixture may be warmed gently to evaporate or distill the remaining chlorine. Final traces of free chlorine may be withdrawn under reduced pressure. The product of reaction is a mixture composed largely of alkyl dichlorocyclohexadienes and alkyl tetrachlorocyclohexenes, with some fully saturated alkyl hexachlorocyclohexane and relatively small amounts of more highly chlorinated compounds. There is no evidence of side chain chlorination in the unsaturated products.

The following examples illustrate the practice of the invention:

*Example 1*

Two mols (212 g.) of ethylbenzene was added dropwise in the course of one hour to 30 mols (2130 g.) of liquid chlorine in a one-gallon wide-mouth Dewar jar, the mouth of which was covered by a transparent "Pyrex" watchglass between additions of ethylbenzene. During the reaction, the vessel and contents were exposed to diffused sunlight, the intensity of which at the mouth of the jar was 15 to 20 foot candles throughout the reaction period. The gas over the reacting liquids was analyzed for hydrogen chloride, and negligible amounts were observed, indicating qualitatively that little substitution chlorination was taking place. The excess chlorine was removed by evaporation, finally under reduced pressure. The product weighed 420 grams and had an average chlorine content of 50 percent, or 3 atoms per mol, and a density of 1.32 at 25°/25° C. The composition of the mixed product was:

| Compound: | Mol percent |
|---|---|
| Ethylbenzene | None |
| Ethyl dichlorocyclohexadiene | 39 |
| Ethyl tetrachlorocyclohexene | 18 |
| Ethyl hexachlorocyclohexane | 28 |
| Fully saturated, mono and polychloro substitution products | 15 |

This composition was confirmed by a study of the dehydrochlorinated products obtained by reacting the product with alcoholic alkali metal hydroxide.

*Example 2*

In a similar manner, 2 mols of ethylbenzene was introduced slowly to 43 mols of liquid chlorine in diffused daylight with a light intensity of 60 to 65 foot candles at the mouth of the vacuum jar. The product, when freed from excess chlorine, weighed 557 grams, had an average chlorine content of 63 percent, or about 5 atoms per mol, and a density of 1.51 at 25°/25° C. Its analysis was:

| Compound: | Mol percent |
|---|---|
| Ethylbenzene | None |
| Ethyl dichlorocyclohexadiene | 25 |
| Ethyl tetrachlorocyclohexene | 11 |
| Ethyl hexachlorocyclohexane | 46 |
| Fully saturated, mono and polychloro substitution products | 18 |

It is observed that, while a slightly smaller excess of chlorine was present in this run than in that of Example 1, the greater light intensity reduced the proportion of unsaturated chlorine adducts from a total of 57 percent in Example 1 to 36 percent in Example 2. For maximum production of the partially unsaturated compounds, the light intensity at the surface of the reacting liquids should be kept below 40 foot candles, and preferably from 0.1 to 20 foot candles.

The crude reaction mixtures, after being freed from elemental chlorine, can be separated into their constituent compounds chromatographically, using any of the usual tower packings for non-polar compounds, such as silica gel, alumina or charcoal.

The method of the invention is applicable to all of the known monoalkylbenzenes, forming in each case new alkyl chlorocyclohexadienes and cyclohexenes without chlorine substitution in the alkyl group.

While the reaction is most conveniently carried out at atmospheric pressure and at a temperature below the atmospheric boiling point of chlorine, it may be effected under superatmospheric pressure sufficient to keep the chlorine liquefied at temperatures suitably at or below $-20°$ C.

I claim:

1. The method which comprises mixing successive small portions of a monoalkylbenzene with an excess of liquid chlorine at a temperature below $-20°$ C. and under sufficient pressure to keep the chlorine liquefied, while exposing the mixture to diffused daylight at an intensity not to exceed 85 foot candles, and removing unreacted elemental chlorine from the reaction mixture to leave a partially unsaturated chlorine adduct of the alkylbenzene as the final product.

2. The method which comprises adding a monoalkylbenzene in successive small portions to an excess of liquid chlorine at atmospheric pressure, while exposing the mixture to diffused daylight at an intensity not to exceed 40 foot candles, and, upon discontinuance of the addition of alkylbenzene, removing unreacted chlorine from the reaction mixture to leave a partially unsaturated chlorine adduct of the alkylbenzene as the final product.

3. The method which comprises adding a monoalkylbenzene in successive small portions to an excess of liquid chlorine at atmospheric pressure, while exposing the mixture to diffused daylight at an intensity from 0.1 to 20 foot candles, and, upon discontinuance of the addition of alkylbenzene, removing unreacted chlorine from the reaction mixture to leave a partially unsaturated chlorine adduct of the alkylbenzene as the final product.

4. The method claimed in claim 1, wherein the monoalkylbenzene employed is ethylbenzene.

5. The method claimed in claim 2, wherein the monoalkylbenzene employed is ethylbenzene.

6. The method claimed in claim 3, wherein the monoalkylbenzene employed is ethylbenzene.

References Cited in the file of this patent

Van der Linden: "Rec. trav. chim. des Pays-Bas," vol. 47, pages 1075–86 (1938).

U. S. DEPARTMENT OF COMMERCE
PATENT OFFICE

CERTIFICATE OF CORRECTION

Patent No. 2,803,600                         August 20, 1957

Frederick H. Norton

It is hereby certified that error appears in the printed specification of the above numbered patent requiring correction and that the said Letters Patent should read as corrected below.

Column 4, lines 28 and 29, under "References Cited", for "vol. 47" read -- vol. 57 --.

Signed and sealed this 18th day of March 1958.

(SEAL)
Attest:
KARL H. AXLINE
Attesting Officer

ROBERT C. WATSON
Commissioner of Patents